(12) United States Patent
Brauer et al.

(10) Patent No.: US 8,229,883 B2
(45) Date of Patent: Jul. 24, 2012

(54) GRAPH BASED RE-COMPOSITION OF DOCUMENT FRAGMENTS FOR NAME ENTITY RECOGNITION UNDER EXPLOITATION OF ENTERPRISE DATABASES

(75) Inventors: Falk Brauer, Dresden (DE); Wojciech Barczynski, Dresden (DE); Hong-Hai Do, London (GB); Alexander Löser, Berlin (DE); Marcus Schramm, Dresden (DE)

(73) Assignee: SAP AG, Walldorf (DE)

( * ) Notice: Subject to any disclaimer, the term of this patent is extended or adjusted under 35 U.S.C. 154(b) by 229 days.

(21) Appl. No.: 12/413,611

(22) Filed: Mar. 30, 2009

(65) Prior Publication Data
US 2010/0250598 A1 Sep. 30, 2010

(51) Int. Cl.
G06F 17/20 (2006.01)
G06F 17/30 (2006.01)
(52) U.S. Cl. ......... 707/602; 707/748; 707/798; 707/809
(58) Field of Classification Search ............... None
See application file for complete search history.

(56) References Cited

U.S. PATENT DOCUMENTS

| | | | |
|---|---|---|---|
| 6,349,299 B1 * | 2/2002 | Spencer et al. | 707/702 |
| 2009/0119240 A1 * | 5/2009 | Fleming et al. | 706/46 |
| 2009/0144609 A1 * | 6/2009 | Liang et al. | 715/230 |

OTHER PUBLICATIONS

"Integrating Unstructured data in Relational Databases", Imran, Proceedings of ICDE 2006.*

David Nadeau and Satoshi Sekine; A survey of named entity recognition and classification; Linguisticae Investigationes, vol. 30, No. 1. (Jan. 2007), pp. 3-26; John Benjamins Publishing Company (http://nlp.cs.nyu.edu/sekine/papers/li07.pdf).
Joseph Hassell, Boanerges Aleman-Meza and I. Budak Arpinar; Ontology-Driven Automatic Entity Disambiguation in Unstructured Text; Proceedings of the 5th International Semantic Web Conference, ISWC 2006, Athens, GA, USA (http://iswc2006.semanticweb.org/items/Arpinar2006pb.pdf).
Venkatesan T.Chakaravarthy, Himanshu Gupta, Prasan Roy and Mukesh Mohania; Efficiently Linking Text Documents with Relevant Structured Information; Proceedings of the 32nd International Conference on Very Large Data Bases, 2006, pp. 667-678, VLDB Endowment (http://www.vldb.org/conf/2006/p667-chakaravarthy.pdf).

(Continued)

*Primary Examiner* — Charles Kim
*Assistant Examiner* — Miranda Huang (57) ABSTRACT

Methods and systems are described that involve recognizing complex entities from text documents with the help of structured data and Natural Language Processing (NLP) techniques. In one embodiment, the method includes receiving a document as input from a set of documents, wherein the document contains text or unstructured data. The method also includes identifying a plurality of text segments from the document via a set of tagging techniques. Further, the method includes matching the identified plurality of text segments against attributes of a set of predefined entities. Lastly, a best matching predefined entity is selected for each text segment from the plurality of text segments.

In one embodiment, the system includes a set of documents, each document containing text or unstructured data. The system also includes a database storage unit that stores a set of predefined entities, wherein each entity contains a set of attributes. Further, the system includes a processor to identify a plurality of text segments from a document via a set of tagging techniques and to match the identified plurality of text segments against the set of attributes.

20 Claims, 8 Drawing Sheets

OTHER PUBLICATIONS

Venkatesan T. Chakaravarthy, Vinayaka Pandit, Sambuddha Roy, Pranjal Awasthi and Mukesh Mohania; Decision Trees for Entity Identification: Approximation Algorithms and Hardness Results; Proceedings of the 26th ACM SIGMOD-SIGACT-SIGART Symposium on Principles of Database Systems, pp. 53-62 , ACM New York, NY, USA 2007 (http://www.cse.iitd.ernet.in/~pandit/dt.pdf).

Zhaoqi Chen, Dmitri V. Kalashnikov and Sharad Mehrotra; Adaptive Graphical Approach to Entity Resolution; Proceedings of the 7th ACM/IEEE-CS Joint Conference on Digital libraries, pp. 204-213, ACM New York, NY, USA 2007 (http://www.ics.uci.edu/~dvk/pub/JCDL07_dvk.pdf).

Frederick Reiss et al.; An Algebraic Approach to Rule-Based Information Extraction; Proceedings of the 24th International Conference on Data Engineering, pp. 933-942, 2008 (http://www.almaden.ibm.com/cs/projects/avatar/pubs/icde2008.pdf).

Andreas Thor and Erhard Rahm; Moma—A Mapping-based Object Matching System; Proceedings of the 3rd Biennial Conf. on Innovative Data Systems Research (CIDR 2007) 2007, pp. 247-258 (http://www.dit.unitn.it/~p2p/RelatedWork/Matching/P27.pdf).

Kristina Toutanova et al.; Feature-Rich Part-of-Speech Tagging with a Cyclic Dependency Network; Proceedings of the 2003 Conference of the North American Chapter of the Association for Computational Linguistics on Human Language Technology—vol. 1, 2003, pp. 173-180 (http://nlp.stanford.edu/pubs/tagging.pdf).

Douglas E. Appelt and Boyan Onyshkevych; The Common Pattern Specification Language, Proceedings of a workshop on held at Baltimore, Maryland, 1998, pp. 23-30, Association for Computational Linguistics Morristown, NJ, USA 1998 (http://www.aclweb.org/anthology-new/X/X98/X98-1004.pdf).

Amit Chandel et al.; Efficient Batch Top-k Search for Dictionary-based Entity Recognition; Proceedings of the 22nd International Conference on Data Engineering, p. 28, IEEE Computer Society Washington, DC, USA, 2006 (http://www.it.iitb.ac.in/~sunita/papers/icde06b.pdf).

Imran R. Mansuri and Sunita Sarawagi; Integrating unstructured data into relational databases; Proceedings of the 22nd International Conference on Data Engineering, p. 29, IEEE Computer Society Washington, DC, USA, 2006 (http://www.it.iitb.ac.in/~sunita/papers/icde06a.pdf).

Yuhua Li et al.; An Approach for Measuring Semantic Similarity between Words Using Multiple Information Sources; IEEE Transactions on Knowledge and Data Engineering, pp. 871-882; vol. 15 , Issue 4, 2003 (http://ieeexplore.ieee.org/xpl/freeabs_all.jsp?arnumber=1209005).

Robert Baumgartner et al., Visual web information extraction with lixto; Proceedings of the 27th International Conference on Very Large Data Bases, pp. 119-128, Morgan Kaufmann Publishers Inc. San Francisco, CA, USA, 2001(http://portal.acm.org/citation.cfm?id=672194).

Matthew Michelson and Craig A. Knoblock; Beginning to Understand Unstructured, Ungrammatical Text: An Information Integration Approach; Proceedings of the AAAI Spring Symposium on Machine Reading, 2007 (http://www.isi.edu/integration/papers/michelson07-sss.pdf).

Hanna M. Wallach; Conditional random fields: An introduction, 2004 (http://www.cs.umass.edu/~wallach/technical_reports/wallach04conditional.pdf).

* cited by examiner

100

MILLER & SON 1 2576 ASHLAND AVE 1 GREEN BAY, WI 54304  A ⟲110

AKRON HEATING                          INVOICE NUMBER: 23234821
1108W, NORTH STREET,    120⟲ B        INVOICE DATE: 08/25/2006
AKRON, OH 44 30B                       ORDER NUMBER 3805504"l

C⟲130

ITEM 1 DESCRIPTION ~ QUANTITY   ~ PRICE    1 NET VALUE

1   CONTROL & REGULATION UNIT   ID MCC-0001    10        D⟲140
45.11USD PER PIECE          451.10 USD
2   ON-SITE REPAIR – GAS FUELED BOILER ID: MCD-0498   10
35.00 USD PER PIECE         350.00 USD

TOTAL INVOICE VALUE (GROSS):  801.10 USD     E⟲150
TAX (10%)              80.11 USD
TOTAL INVOICE VALUE (NET):    881.21 USD

BEST REGARDS

SALLY JONES   F⟲160

A. SUPPLIER DATA
B. CUSTOMER DATA
C. KEY FIGURES
D. PRODUCT DATA
E. PAYMENT DATA
F. CONTACT PERSON

GRAPH BASED RE-COMPOSITION OF DOCUMENT FRAGMENTS FOR NAME ENTITY RECOGNITION UNDER EXPLOITATION OF ENTERPRISE DATABASES

FIELD OF INVENTION

Embodiments of the invention relate generally to the software arts, and, more specifically, to methods and systems for recognizing complex entities from text documents with the help of structured data and Natural Language Processing (NLP) techniques.

BACKGROUND

In the field of computing, Natural Language Processing (NLP) is a field concerned with the interactions between computers and human (e.g., natural) languages. Natural language generation systems convert information from computer databases into readable human language. The term "natural language" is used to distinguish human languages from computer languages (e.g., C++ or Java). The NLP may be used for both, text and speech recognition, although, over time, the work on speech processing has evolved into a separate field. In NLP, information extraction is a type of information retrieval, whose purpose is to automatically extract structured information from unstructured machine-readable documents. A broad goal of the information extraction is to allow computation to be done on the previously unstructured data. A more specific goal is to allow logical reasoning to draw inferences based on the logical content of the input data. A typical usage of the information extraction is to scan a set of documents written in a natural language and populate a database with the information extracted. More specifically, the information extraction includes tasks such as named entity recognition, terminology extraction, and relationship extraction. The named entity recognition locates and classifies atomic elements in text into predefined categories such as the names of persons, organizations, locations, expressions of times, quantities, and so on.

Data transactions between business partners often include unstructured data such as invoices or purchase orders. To process such unstructured data automatically, complex business entities need to be identified. Examples of such complex business entities include products, business partners, and purchase orders that are stored in a supplier relationship management system. Both, structured records in the enterprise system and text data, describe these complex entities. Analyzing and integrating documents in a supplier relationship management system is typically a manual process. For example, an agent checks for a purchase order identifier (ID) in an invoice. If such an ID is found, the agent associates the document with structured data for the purchase order in the supply relationship management system and checks whether the purchase order corresponds to the invoice. If no ID is found, the agent creates an invoice in the system and manually enters the relevant information. However, automatic identification of the ID and the associated data stored with the purchase order in the structured data within the invoice could save time and reduce expenses and human errors.

Identification of entities from unstructured text to create machine readable knowledge has been investigated for several decades. There are many approaches in this area, such as the Named Entity Recognition. Three main techniques have been employed in the past for identifying entities: 1) based on rules describing the patterns of occurrence of entities; 2) machine learning techniques to identify best matching feature-combination on the basis of training data; and 3) lookup of predefined entities in a domain-specific dictionary. However, these techniques do not link extracted data to structured data nor do they map relationships in the structured data to relationships implicit in the text.

SUMMARY

Methods and systems that involve recognizing complex entities from text documents with the help of structured data and Natural Language Processing (NLP) techniques are described herein. In one embodiment, the method includes receiving a document as input from a set of documents, wherein the document contains text or unstructured data. The method also includes identifying a plurality of text segments from the document via a set of tagging techniques. Further, the method includes matching the identified plurality of text segments against attributes of a set of predefined entities. Lastly, a best matching predefined entity is selected for each text segment from the plurality of text segments.

In one embodiment, the system includes a set of documents, each document containing text or unstructured data. The system also includes a database storage unit that stores a set of predefined entities, wherein each entity contains a set of attributes. Further, the system includes a processor operable to identify a plurality of text segments from a document via a set of tagging techniques and to match the identified plurality of text segments against the set of attributes.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Embodiments of the invention relate to a process for recognizing complex entities from text documents with the help of structured data and Natural Language Processing (NLP) techniques. To detect complex entities in documents with high precision, domain knowledge from structured and unstructured data is used. Embodiments of the invention include the recognition of candidates in a text structure, the matching of attributes and text segments using structured data, and the disambiguation and consolidation of matching candidates. For each phase of the process, components in a common architecture are defined. A generic index structure is created to cope with common complex data types and define an initial set of entity matching operators.

Figure 1A:
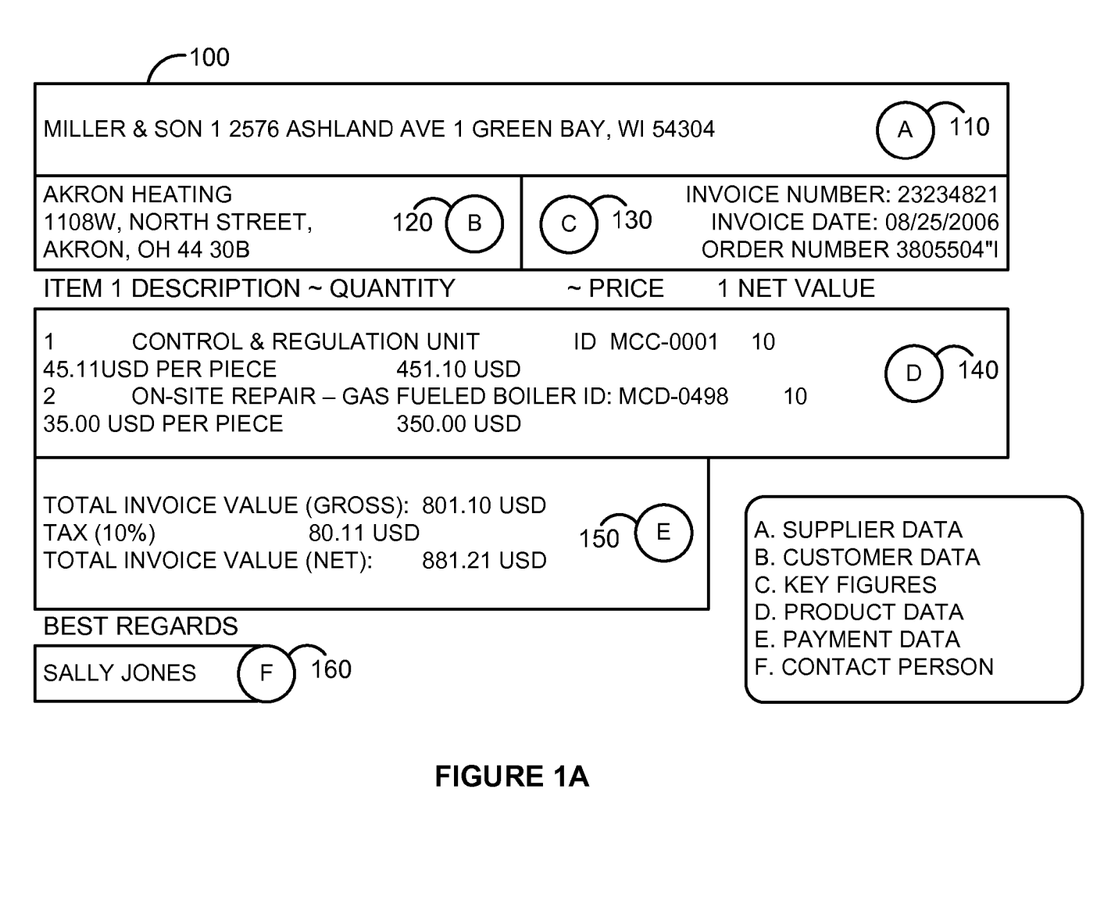
FIG. 1A is an example invoice from a supplier in a Supplier Relationship Management (SRM) system.

FIG. 1A is an example invoice from a supplier in a Supplier Relationship Management (SRM) system. For a company, a common task in a SRM system is to relate incoming invoices to purchase orders. The invoices are often in the form of non-electronic documents, such as faxes. They need to be interpreted to verify that the purchase orders and the invoices are consistent with each other in terms of ordered products and quantities, and agreed upon prices. Invoice 100 includes supplier data 110 (such as name and address), customer data 120, key figures 130, product data 140, payment data 150, and contact person 160. The text from the invoice can be extracted using text recognition software (e.g., Optical Character Recognition software). The output provides electronic data for further automatic processing. For example, the name of the supplier, "Miller & Son", and the customer name, "Akron Heating", can be recognized as organization names. The address information of supplier data 110 and customer data 120 can be recognized with typical structures of house number, street name, and postal codes.

Figure 1B:
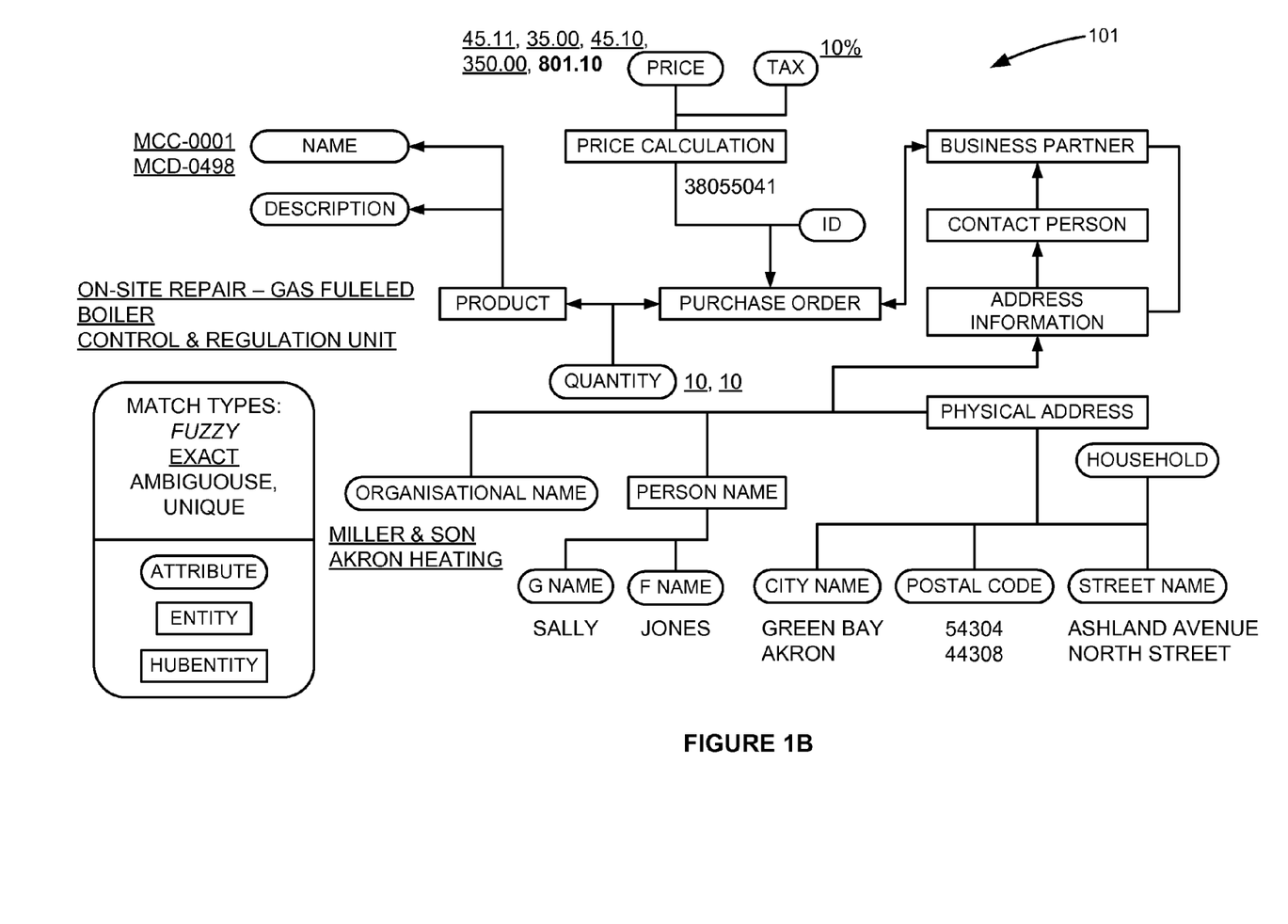
FIG. 1B is an exemplary schema extract from a Supplier Relationship Management (SRM) system and corresponding matched attributes.

FIG. 1B is an exemplary schema extract from a Supplier Relationship Management (SRM) system and corresponding matched attributes. Diagram 101 presents a database structure of predefined entities in accordance with invoice 100. For automatic processing of an invoice (e.g., invoice 100), the invoice data, such as supplier and customer data, product data, address data, needs to be recognized from the text and matched against a given SRM database structure, as shown with diagram 101. This is done by identifying predefined entities in unstructured data. The predefined entities are described in a data model and stored in a structured way in a database.

Figure 2A:
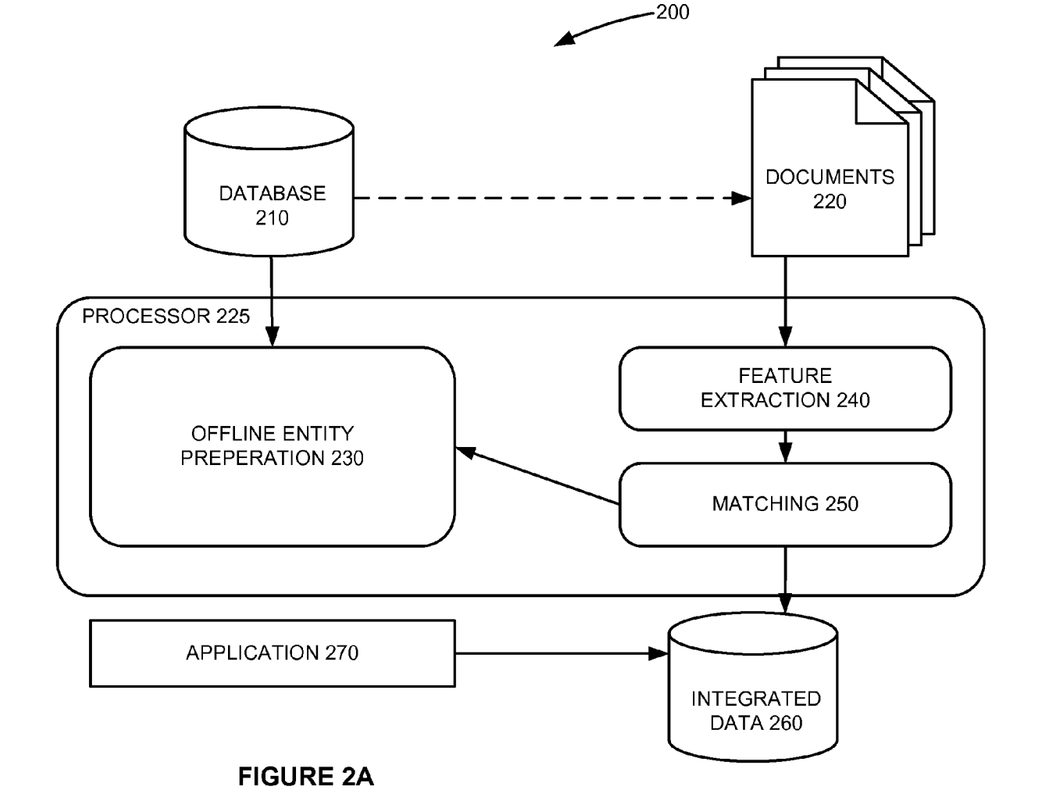
FIG. 2A is a block diagram of an embodiment of the invention that shows the architectural components of a system for identifying pre-defined entities in unstructured data.

FIG. 2A is a block diagram of an embodiment of the invention that shows the architectural components of a system for identifying pre-defined entities in unstructured data. Block diagram 200 includes a storage unit, such as database 210 that stores entities' data in a structured way. Block diagram 200 also includes a set of documents 220 that contain text or unstructured data comprising the entities that are to be identified. The documents may be stored in a document storage unit, such as a database. Further, diagram 200 includes a processor 225 to perform the entity recognition. Processor 225 performs three phases of data processing starting with entity data preparation 230. The entity data preparation phase 230 analyzes the stored data of the entities in database 210 and obtains a suitable data structure. The second phase presented in diagram 200 is document feature extraction 240. The document feature extraction 240 phase parses each document of the set of documents 220 and extracts text segments in which the entities of interest are to be identified. The last phase of processing is matching of text segments and entity attributes 250. The matching 250 phase matches the extracted text segments from the second phase with the obtained data structure from the first phase.

Block diagram 200 also includes integrated data 260 that consists of structures of integrated data resulting from matching the data structure entities with extracted text segments. The integrated data 260 is used in applications 270 (e.g., an SRM application).

Figure 2B:
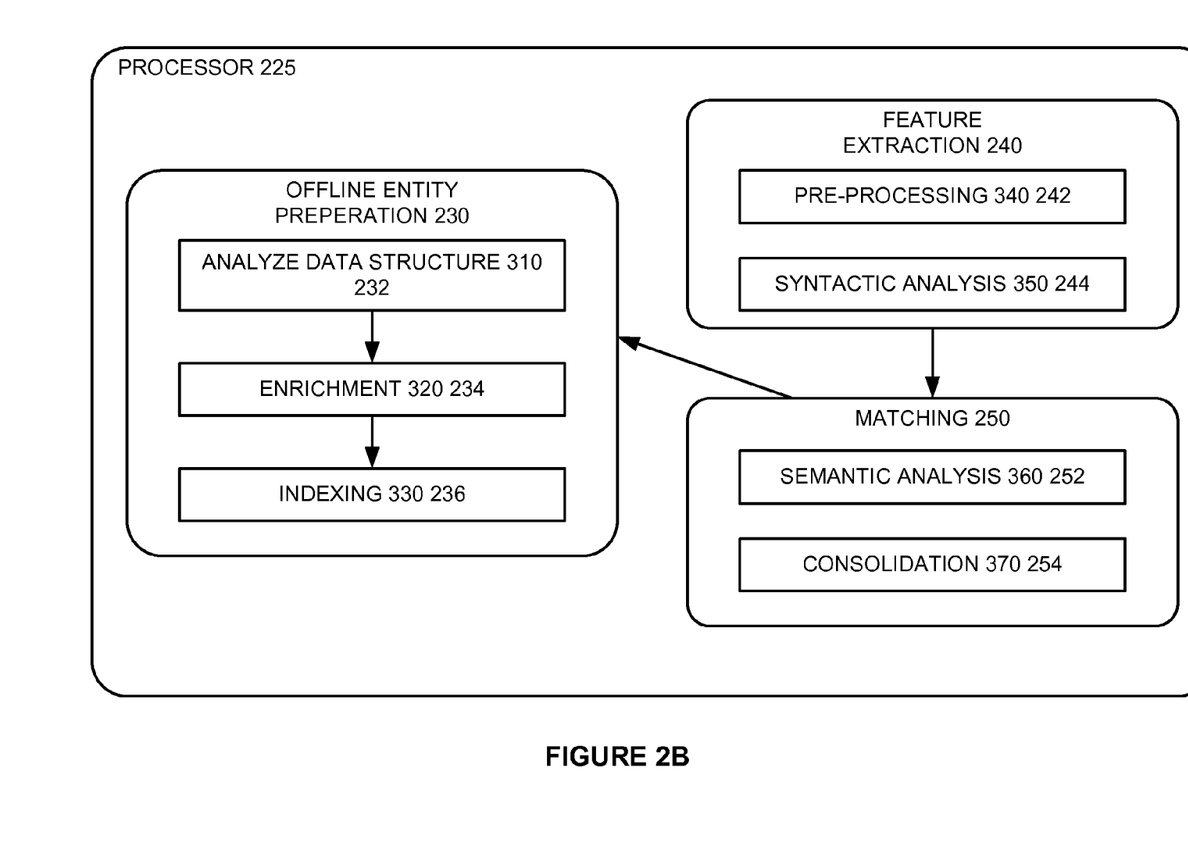
FIG. 2B is a block diagram of an embodiment of the invention that shows the processing phases in details.

FIG. 2B is a block diagram of an embodiment of the invention that illustrates the processing phases with additional details. The entity data preparation 230 analyzes the database 210 for predefined entities. By considering the schema and instance data, and domain knowledge, characteristics (e.g., attributes and relationships) of the entities may be extracted from database 210. The result of the entity data preparation 230 phase is a set of so-called inverted indices, in which the prepared entity characteristics are stored in a manner that enables fast matching of text segments and entity attributes. To obtain the index, the database 210 of entity data is analyzed. At block 232, the data structure of the entities is analyzed. Usually, this step is done automatically. In an embodiment, the database schema is reverse-engineered to obtain an entity model. Each database table may entail an entity type in the entity model with the primary key as the identifier attribute of the entity type. The relationships between the entity types may be derived from foreign keys. In case the tables lack foreign keys and primary keys, the user can manually supply such information.

At block 234, the entity model is enriched. The entity model can be enriched with domain-specific information in form of weights to indicate the quality of relationships between attributes and entity types and between the entity types as well. For example, the relationship between an identifier attribute (preferably with unique values) to an entity type has a higher weight than the relationships between other attributes to the entity type. Similarly, a product is a better entity type to identify a purchase order than a business partner, leading to higher weight between the entity types "product" and "purchase order" than between "business partner" and "purchase order". The user may first assign initial weights for the relationships, which are then adjusted according to the data derived from the database 210 (e.g., degree of redundancy in attribute values.)

Offline entity preparation 230 also includes indexing 236. In an embodiment, an index structure is developed to store the relationships between attribute values and entities. Data from single database tables may be parsed to build a set of inverted indices. Each index may store all relationships of the attribute values to entities of a particular entity type. The indices are specialized for word phrase queries and held in memory for fast matching.

The feature extraction phase 240 receives a document with text or unstructured data selected from the set of documents 220 as an input. It is within this document that specific entities are to be identified. Text segments are identified for matching against entity attributes. This phase includes pre-processing 242 and syntactic analysis 244. In pre-processing 242, the document is parsed to extract text data. If the document is not in a text format, different parsers may be used, such as an XML parser if the text is in XML format. Syntactic analysis 244 may apply NLP techniques to obtain the document's structure. First, it is necessary to recognize paragraphs and sentences, which can be recognized by empty lines and punctuation. Additionally, various tagging techniques (e.g., Part-of-Speech tagging) may be used to obtain text segments (such as a word phrase, sentence, or paragraph) as candidates for attribute matching.

In an embodiment, matching phase 250 relies on the output of the offline entity preparation 230 and feature extraction phase 240. Matching phase 250 matches the identified text segments from feature extraction 240 against the attributes of the entities from database 210 of the offline entity preparation 230. Matching 250 may include the following two steps: semantic analysis 252 and consolidation 254. In semantic analysis 252, the text segments are queried against the attribute indices to obtain matching attributes. Fuzzy matches may be supported by approximate string matching. For each queried text segment, the resulting attribute matches and the matching similarity computed by edit distance are stored for the next processing step, consolidation 254. In consolidation 254, an entity graph is constructed from the matching relationships between text segments and attributes, between attributes and entities, and between the entities themselves. Along with the relationships in the graph, the matching similarities are combined with the weights of relationships between text segments and entities. Using these weights, the matching entities can be ranked and the best matching entity can be identified for a given text segment.

Figure 3:
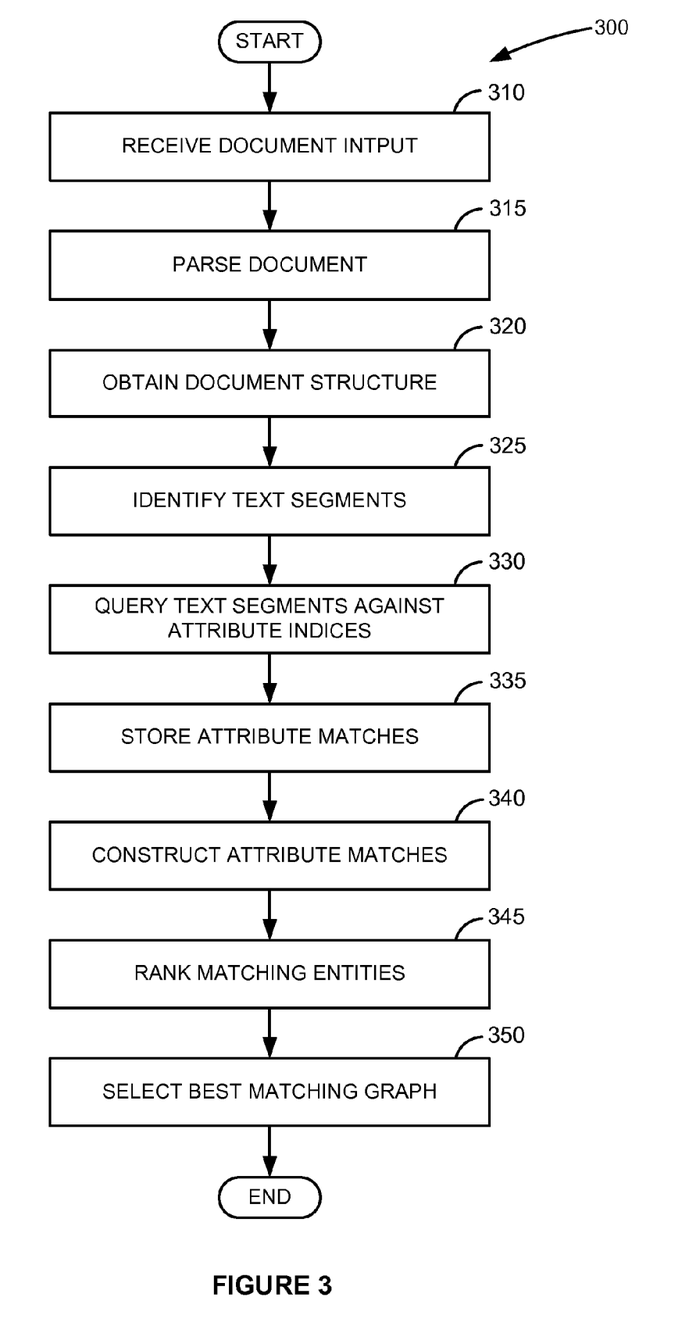
FIG. 3 is a flow diagram of an embodiment for identifying complex predefined entities in unstructured data.

FIG. 3 is a flow diagram of an embodiment for identifying complex predefined entities in unstructured data. Diagram 300 describes the recognition of candidates in a text structure, matching of attributes and text segments using structured data and the disambiguation and consolidation of matching candidates. At block 310, a document selected from a set of documents is received as input data. The document preferably contains text or unstructured data. At block 315, the text document is parsed by a corresponding parser to extract text data. If the document is not in a text format, different parsers may be used, such as an XML parser if the text is in XML format. At block 320, NLP techniques are applied on the document to obtain document's structure. Then, at block 325, text segments are identified as candidates for attribute matching using tagging techniques. The identified text segments have to be matched against the attributes of predefined entities. The predefined entities are organized in an entity model stored in a database.

At block 330, the text segments are queried against attribute indices to obtain matching attributes. For each queried text segment, the resulting matching attributes and the matching similarity are stored at block 335. At block 340, a set of entity graphs is constructed from the matching relationships between text segments and attributes, between attributes and entities, and between the entities themselves. At block 345, the matching entities of each graph are ranked using weight values. At block 350, the best matching entity for a given text segment is selected.

Figure 4:
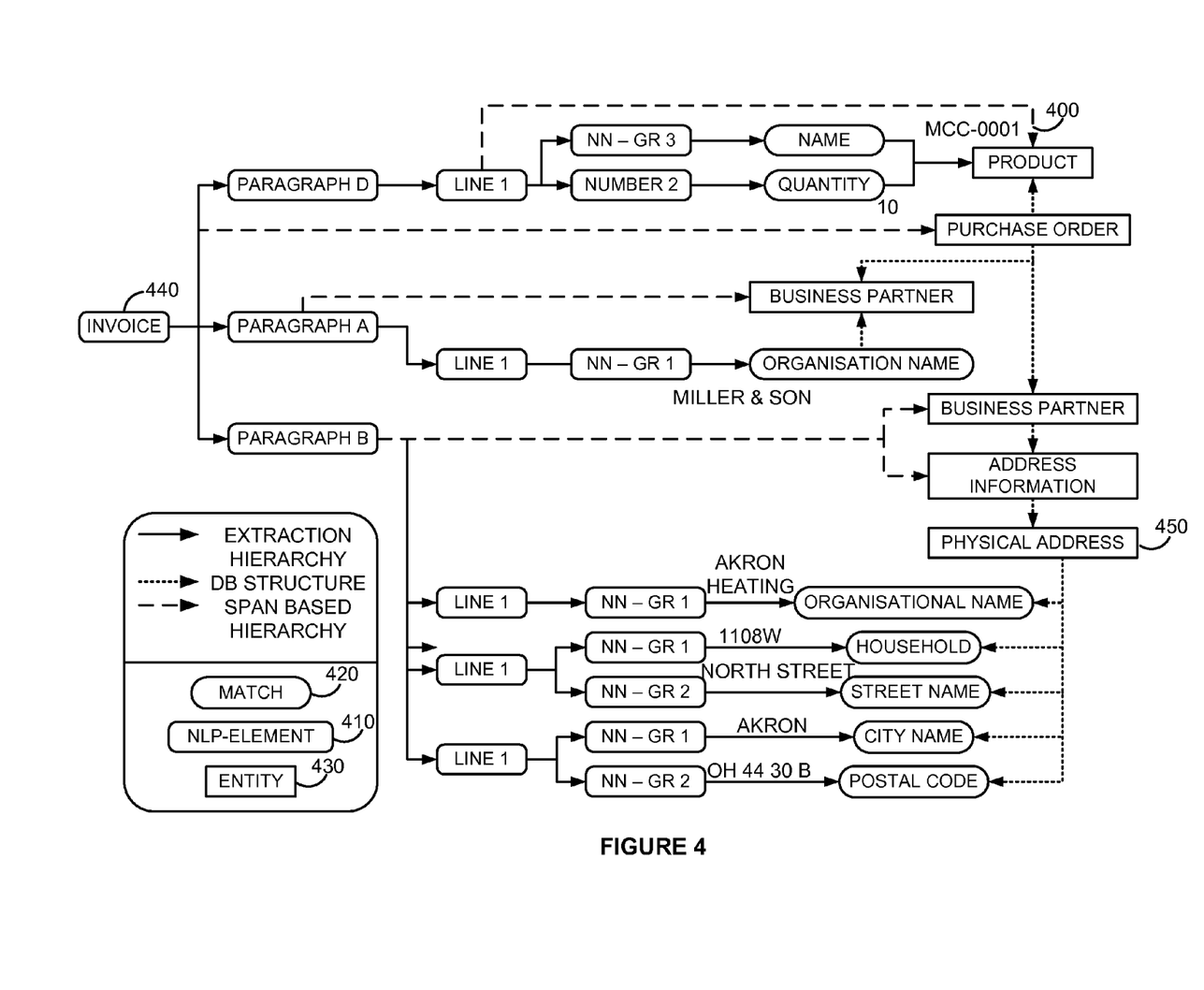
FIG. 4 is a diagram of an embodiment of a data structure presenting extract of a desired result.

FIG. 4 is a diagram of an embodiment of a data structure 400 illustrating desired result of an extraction with respect to exemplary invoice 100 of FIG. 1. Data structure 400 includes NLP elements 410 that are recognized text segments from the set of documents 220. Data structure 400 also includes matched attributes 420 that are connectors between the unstructured data and structured data. The data structure 400 also includes recognized entities 430. The data structure 400 shows the different types of relationships such as the hierarchy of the text structure, relationships within the enterprise data and the span based hierarchy. The span based hierarchy may be created by the computation of the spans (e.g., begin- and end-offsets within the text) of the related attribute matches. Data structure 400 presents the result from parsing the invoice 100 of FIG. 1 using NLP techniques and matching all recognized elements of the invoice 100 with a data structure from database 110, thus generating a graph of matched elements.

The structure of the graph may be built using the NLP techniques. The left side of the graph begins with invoice 440 as a root element. Invoice 440 NLP element may include a number of paragraphs, according to the document of interest such as invoice 100 (for example, paragraph d, paragraph a, and paragraph b.) For each paragraph, a number of lines are identified and for each line, a number of elements are identified. The right side of data structure 400 presents the recognized entities from database 110 and the matched attributes between the extracted data of invoice 100 and the data structure of entities from database 110. For example, the recognized entity Physical Address 450 and the matched attributes: Organizational Name, Household, Street Name, City Name, and Postal code.

To obtain a data structure from the database containing the semantics and instance-data of the entities, a model of the entity-types, their attributes, and relationship-types is required. Therefore, the database-schema may be wrapped and a user may assign initial weights ($W_{ini}$) for the attributes (a) and weights for the relations (r) (for example, $W_{ini}(a/r)$.) These weights describe distances between attributes and entities, and among related entities. The weights are adjusted over the instance data of the database to obtain a data model. Then, the instance data is indexed and combined with the computed weights.

Figure 5:
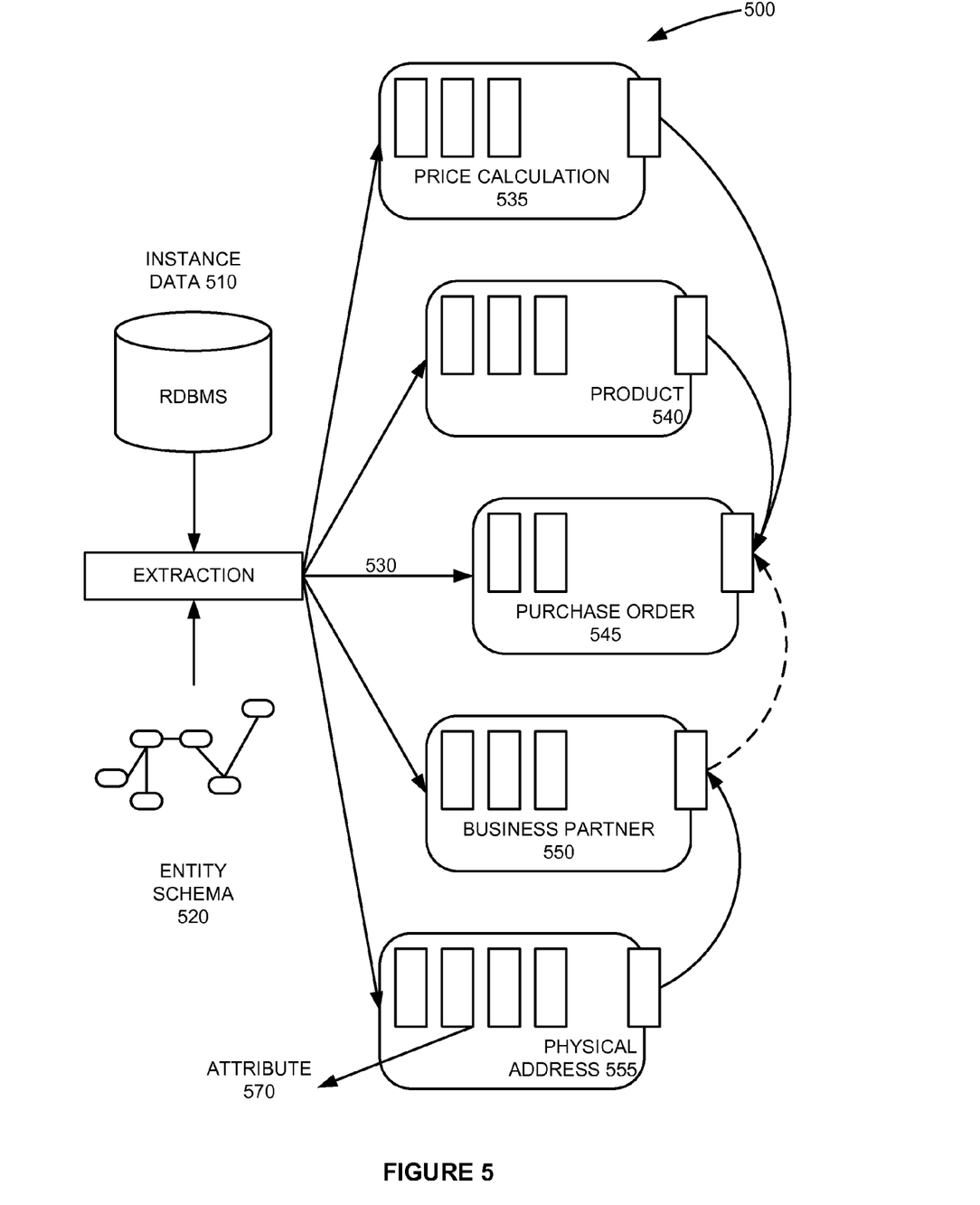
FIG. 5 is a diagram of an embodiment of an inverted index data structure.

FIG. 5 is a diagram of an embodiment of an inverted index data structure. To capture the relationships among the entities in the database several relationship indices may be used, one for each attribute type grouped by entity types, for instance. FIG. 5 includes instance data 510 and entity schema data 520. At block 530, attributes and relationships of the entities may be extracted by considering the entity schema 520 and instance data 510. Data structure 500 presents a number of entities, such as Price Calculation 535, Product 540, Purchase Order 545, Business Partner 550, and Physical Address 555. Some of the entities may be related with each other, for example, Price Calculation 535 and Product 540 are related to Purchase Order 545. Each entity has an identifier (ID) and a relationship ID. Relationship indices can be created for the entities, such as a relationship index for Purchase Order 545. A relationship index consists of all relationships of one entity to other entities of several types. It is built of the following fields: ID of the relationship's source entity ID (the search field of this index); the type of the target entity; the target entity ID; the weight of this relationship w(r), wherein the weight value is between 0 and 1 (i.e., w(r): ($0 \leq w(r) \leq 1$); and the name of this relationship. The relationships can be either unidirectional or bidirectional. The weight value that is equal to zero (i.e., $W_{ini}(r)=1$) is reserved for unique identifiers in the attribute list.

In an embodiment, attribute indices may also be created, e.g., for attribute 570 of Physical Address 555. The attribute index consists of: the ID of the entity; the content of the attribute (the search field of this index); and the weight w(r) ($0 \leq w(r) \leq 1$), according to the trustworthiness for identifying the entity.

The weights may be set by the user with initial values. These values may need to be adjusted to obtain a correct data model that overcomes applying an ambiguous attribute to a certain entity or following an ambiguous relationship between entities. Thus, the initial attribute weight values may be adjusted by computing an adjusted weight w(a) of the user's initial weights $W_{ini}(a)$ by the attribute's content c(a) over one attribute index by a normalized Inverse Document Frequency (IDF) value. The normalized IDF value (normIDF) is between 0 and 1. The adjusted weight can be computed with the following equation:

$$w(a) = \lambda * W_{ini}(a) + (1-\lambda) \text{normIDF}(c(a))$$

The IDF is commonly used in natural language's environments and $\lambda (0 \leq \lambda \leq 1)$ is a tunable parameter to balance the weights. In addition, the initial relationship's weights $W_{ini}(r)$ with similar names (representing the same semantics) n(r) are adjusted for each entity e. The adjusted relationship weight can be computed with a similar equation:

$$w(r) = \lambda * W_{ini}(r) + (1-\lambda) \text{normIDF}(e, n(r))$$

After the relationship weights and the attribute weights of the entities are adjusted, the index data structure is created. The creation of relationship indices and attribute indices together with the adjustment of the weights are performed in the offline entity preparation phase 230. As a result, there is a data model structure that is adjusted to external knowledge on instance level representing the user's knowledge of the domain and the knowledge of ambiguity retrieved from the enterprise system.

As discussed with respect to FIG. 3, the entity matching phase 250 includes semantic analysis 252 and consolidation 254. The matching takes as input the candidate text segments identified by syntactic analysis 244 and identifies the best matching entities by a probabilistic sub-graph analysis based on the data model structure.

The semantic analysis 252 targets the semantic interpretation of the candidate phrases cp to map them to certain attributes. Therefore, variants $v_i$ of them are queried to the data model. The variants may be consecutive word phrases, for example, if the candidate phrase is "Control & Regulation Unit" (i.e., cp="Control & Regulation Unit"), then the variants may be: "Control & Regulation Unit", "Regulation Unit", "Control Unit", and so on. While querying indices will allow a maximal threshold th of fuzziness (i.e., th=0.9). If there are ambiguous matches, then the match weights $w_m(a)$ are adjusted corresponding to their similarity $\text{sim}(a_i, cp)$. In addition, the term frequency tf, representing the attribute match frequency, is taken into account to measure the importance of an attribute match within a text. The adjustment can be computed with:

$$w_m(a) = w(a) * \frac{1}{N(m)} \sum_{i=0}^{tf} \text{sim}(a_i, cp)$$

N(m) is the number of all matched candidate phrases, used for normalization. To measure the matches, the Dice's Coefficient (measurement of names) in combination with the Levenstein Distance values $ld(t_k(a), t_k(cp))$ may be used for each corresponding token in the attributes $t_k(a)$ and the candidate phrase $t_k(cp)$ for targeting identifiers and numbers. The equation for measuring the matches is:

$$\text{sim}(a, cp) = \frac{2 * |a \cap cp|}{|a| + |cp|} * \frac{1}{k} \sum ld(tk(a), tk(cp))$$

Where $|a \cap cp|$ is the number of similar words and $|a|+|cp|$ is the sum of the number of words in the attribute and the candidate phrase. The result of the semantic analysis 252 phase is a set of weighted attribute mappings to document's content.

Figure 6:
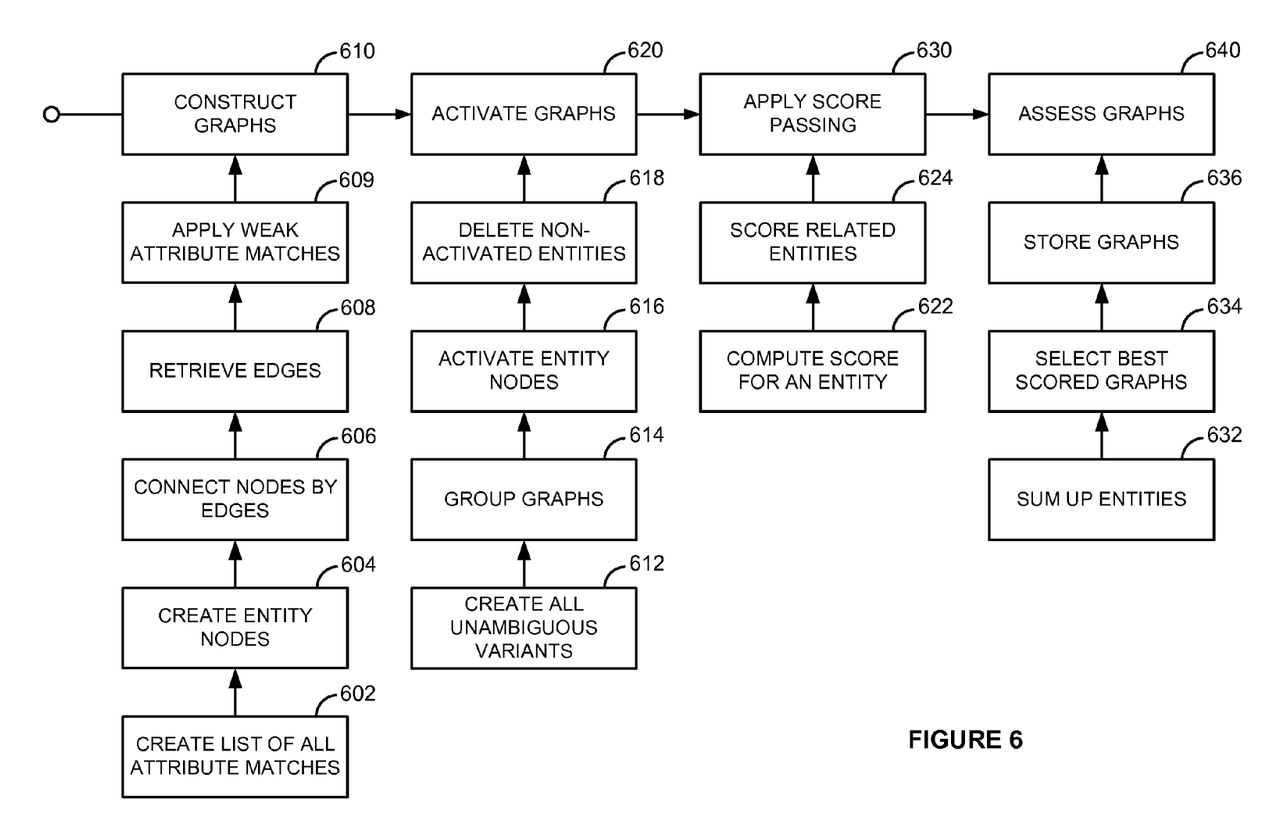
FIG. 6 is a flow diagram of an embodiment for resolution and scoring of relevant entities and their relationships among each other for disambiguation.

FIG. 6 is a flow diagram of an embodiment for resolution and scoring of relevant entities and their relationships among each other for disambiguation. Process 600 represent the consolidation 254 step of the matching phase 250. At block 610, an entity graph is constructed. The graph construction has the purpose to create all possible interpretations of a text in form of an entity graph. In an embodiment, the graph may be constructed with the following algorithm shown in Table 1:

TABLE 1

Graph Construction
Algorithm 1: Graph construction

Require: WAttrs strongAttrs[ ], SAttrs weakAttrs[ ], DbIndex db, int th
1: Graph result
2: result = resolve_attributes(result, strongAttrs)
3: for all cEnt in result:getEntityNodes( ) do
4:   result = resolve_related_entities(result, cEnt, db, th)
5: end for
6: result = resolve_attribute(result, weakAttrs)
7: return result The graph construction 610 consists of several steps. First, at block 602, all attribute matches are retrieved. At block 604, for each attribute match, a corresponding entity node is created or retrieved, if it has been already created. This is further described with the following algorithm shown in Table 2:

TABLE 2

Resolve Attributes
Algorithm 2: Function resolve attributes

Require: Graph result, Attrs attrs,
1: {Create nodes for matches}
2: while idx < attrs.length do
3:   nAttr = result.addAttrNode(attrs[idx])
4:   for all ent in attrs[idx].getEntities( ) do
5:     if result.isExist(ent) AND attrs.isStrongList( ) then
6:       nEnt = result.addEntityNode(ent)
7:     end if
8:     result.addEdge(nAttr, nEnt)
9:   end for
10: end while
11: return result At block 606, the entity nodes are connected by an edge (i.e., entity-to-entity). At block 608, the edges for entity-to-entity relations are retrieved from the data model. This is further described with the following algorithm:

TABLE 3

Resolve Related Entities
Algorithm 3: Function resolve related entities

Require: Graph result, Node cEnt, DbIndex db, int distance
1: if distance >0 then
2:   Node relEnt[ ] = db.getRelEntites(cEnt);
3:   for all aEnt in relEnt do
4:     if !result.isEnNodeExist(aEnt) then
5:       result.addEntityNode(aEnt)
6:       result = resolve related entities(aEnt, result, db, distance−1)
7:     end if
8:     result.addEdge(aEnt, cEnt)
9:   end for
10: end if
11: return result The corresponding entity nodes and edges are assigned. The maximum path length of relations to be resolved may be limited by a given threshold th. For example, in the schema shown in FIG. 2, if the threshold is 3 (i.e., th=3), then the path length includes three distances relations between two entities, such as the distance between PhysicalAddress and PurchaseOrder. As result, several graphs may be built upon the attribute matches containing all possible interpretations of the text. At block 609, the weak attribute matches are applied, these are with the lower weights. The attribute-to-entity edges are labeled with the weights $w_m(a)$ and the entity-to-entity edges by the relationship weights $w_m(r)$.

After the graphs are constructed, the graphs are activated at block 620. The graph activation consists of several steps. First step of the graph activation is disambiguation of the previously created graphs. Therefore, a graph walk at one attribute match can be initiated. At block 612, all unambiguous variants of each contiguous graph are created. At block 614, the graphs that represent differing interpretations are grouped together. At block 616, every entity node that has the following features is activated: 1) has a matched attribute (Authority $e^A$); 2) has at minimum two input edges (Hub $e^H$); 3) entity node that connects two entities without own attribute matches (i.e., $e_i^{A/H/C}$ and $e_k^{A/H/C}$); and 4) has an input edge with $w_{ini}$ (r)=1.0 from $e_i^{A/H/E}$ (Extended Authority $e^E$). At block 618, all non-activated entities are deleted.

At block 630, score passing is applied to the resulting graphs. The purpose of this step is to apply the match weights $w_m(a)$ to the neighboring entity nodes and through the whole graph. At block 622, the score score($e^A$) for a certain authority entity $e^A$ is computed. This is done by summing the weights of connected attribute matches $w_m(a_i)$:

$$\text{score}(e^A) = \sum_{i=0}^{n} w_m(a_i)$$

Then, these scores are passed for scoring related entities score($e^{E/H/C}$) at block 624. For this, the score of all incoming edges are scored by using the relationship weights $w_a(r_i)$ as:

$$\text{score}(e^{A/H/C/E}) = \sum_{i=0}^{n} \text{score}(e_i) * w(r_i)$$

Once the edges have committed their scores, they are considered as non-active to avoid cycles. At the end of this processing step, there are several groups of contiguous graphs representing interpretations of a text.

At block 640, graph assessment is performed. It has to be decided which graph out of which group describes a text best. The compact, contiguous graphs are more likely to be informative than the huge scattered graphs. Therefore, at block 632, all authority and hub entities are summed up. The graph assessment is done by the following:

$$\text{score}(G) = \sum_{i=0}^{n} \text{score}(e_i^A) + \sum_{j=0}^{m} \text{score}(e_j^H)$$

At block 634, the best scored graph is selected out of each group that best describes a text segment. The selected graphs are stored at block 636 together with the spans (e.g., offsets of beginnings and endings) of the attribute and entity matches and the links to the structured data source. The application running above this integrated data structure (such as application 270) is now able to provide the entities extracted from the document to access the text structure based on the resolved entity spans. The application can decide whether all required information was found and thus, to create automatically a data structure for the received invoice within the enterprise database.

A key feature of the entity recognition process is its adaptability to other domains and application scenarios. An embodiment of the invention can be implemented in a customer relationship management (CRM) system. In CRM, e-mails represent documents and complex entities represent customer data, address data, customer payment records, and so on. Incoming customer e-mails need to be mapped to existing business transactions, customer data needs to be recognized and updated automatically. Another embodiment includes the recognition of product data in postings of a developer forum. From the postings products, product scenarios and error messages need to be recognized and mapped against existing product data.

In an embodiment, the architecture of the process for entity recognition may be based on algebraic information extraction framework. The framework may handle the extraction flow, persist extracted data, and provide operators for defining the extraction logic. It may cover base operators such as an importer from the file system, and wrappers for NLP operations such as sentence detector, paragraph detector, etc. Further, a regular expression annotator may be used to detect entities such as e-mail addresses, URLs, phone numbers, zip codes, and so on. Another common annotator is the attribute matcher, which creates annotations based on attribute indices that are derived from the attributes of structured data. An entity resolver operator uses attribute-entity relationships.

To estimate the performance of the process for entity recognition, 250 exemplary documents were analyzed in a test environment consisting of a 2 GHZ desktop machine with 2 GB of main memory and having 130.000 entities indexed. The time and memory consumption were measured for common operators executed on all documents. The table below shows four relevant measures for each operator: absolute time consumption $t_{abs}$, relative time consumption $t_{rel}$, absolute memory consumption of the Java Virtual Machine (JVM) mem, and the difference measurement to the previous processing step diff$_{mem}$, since the memory consumption is difficult to be measured in a Java environment. It should be appreciated that the process of entity recognition is not limited to the Java environment only; it could be performed in any other appropriate environment.

TABLE 4

Performance Assessment

| Operator | $t_{abs}$ | $t_{rel}$ | mem | diff$_{mem}$ |
|---|---|---|---|---|
| Import Operator | 16.68 s | 3.02% | 5.17 MB | 0 |
| Paragraph Detector | 6.03 s | 1.09% | 6.70 MB | 1.53 MB |
| Sentence Detector | 7.56 s | 1.37% | 7.34 MB | 0.63 MB |
| Noun Grouper | 84.98 s | 15.40% | 88.90 MB | 82.19 MB |
| Attribute Matcher | 211.17 s | 38.27% | 269.76 MB | 180.86 MB |
| Entity Resolver | 124.29 s | 22.53% | 287.50 MB | 17.73 MB |

In the current example, the memory consumption of the database is constantly about 250 MB. Attribute matcher and entity resolver consume about 60% of the whole processing time, because all known indices are loaded into the main memory. Regular expression operations, such as paragraph and sentence detection, require little main memory, while the noun grouper significantly raises the memory consumption.

Elements of embodiments may also be provided as a tangible machine-readable medium (e.g., computer-readable medium) for tangibly storing the machine-executable instructions. The tangible machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. For example, embodiments of the invention may be downloaded as a computer program, which may be transferred from a remote computer (e.g., a server) to a requesting computer (e.g., a client) via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

The invention claimed is:

1. A non-transitory computer-readable storage medium tangibly storing machine-readable instructions thereon, which when executed by the machine, cause the machine to:
   receive a document containing text or unstructured data, wherein the document is a representation of a physical business object stored in a document storage unit;
   identify and extract a plurality of text segments and structure of the document using a set of tagging and natural language processing techniques;
   query the extracted plurality of text segments against a set of inverted indices, wherein the set of inverted indices comprises attributes of a set of predefined data structure entities and associated relationships based on weight values in an entity model structure;
   for a text segment from the extracted plurality of text segments, store matching attributes of the set of predefined data structure entities and associated relationships;
   construct a set of entity graphs including a plurality of entity nodes connected by a weighted edge representing the matching attributes and associated relationships between the plurality of text segments and the attributes of the set of predefined data structure entities, between the attributes and the set of predefined data structure entities, and between data structure entities in the set of predefined data structure entities;
   rank the set of entity graphs based on a sum of the weight values associated with the matching attributes and associated relationships; and
   select higher scored one or more entity graphs of the set of entity graphs based on the ranking.

2. The non-transitory computer-readable storage medium of claim 1 having instructions that when executed further cause the machine to:
   parse the document via a parser; and
   in response to parsing the document, extract the text segment of the document.

3. The non-transitory computer-readable storage medium of claim 1 having instructions that when executed further cause the machine to:
   apply text recognition techniques to the document; and
   in response to applying the text recognition techniques, obtain the structure of the document.

4. The non-transitory computer-readable storage medium of claim 1 having instructions that when executed further cause the machine to:
   determine the matching attributes and associated relationships for at least one of the queried plurality of text segments; and
   determine the weight values for the matching attributes and associated relationships between the at least one of the queried plurality of text segments and the set of predefined data structure entities to construct the set of entity graphs.

5. The non-transitory computer-readable storage medium of claim 4 having instructions that when executed further cause the machine to:
   create a set of unambiguous graph variants for each graph in the set of entity graphs; and
   create a set of groups, each group including a subset of the set of entity graphs and representing interpretations of the at least one of the queried plurality of text segments.

6. The non-transitory computer-readable storage medium of claim 5 having instructions that when executed further cause the machine to:
   sum the weight values for the matching attributes and associated relationships in each entity graph of the set of groups; and
   select an entity graph from each group of the set of groups, the entity graph having a best weight value and representing a best interpretation of the at least one of the queried plurality of text segments.

7. The non-transitory computer-readable storage medium of claim 1, wherein the document comprises an invoice, the predefined data structure entities comprises attributes of a purchase order, and the set of entity graphs comprises the matching attributes and associated relationships between the invoice and the purchase order.

8. A computing system comprising:
   a set of documents stored in a document storage unit, a document from the set of documents comprising text or unstructured data;
   a database storage unit that stores a set of inverted indices including predefined data structure entities organized in an entity model structure, wherein an entity from the set of predefined entities has a set of characteristics including attributes and associated relationships based on weight values; and
   a processor in communication with the database storage unit and the document storage unit, the processor to:
      identify and extract a plurality of text segments and structure of the document using a set of tagging and natural language processing techniques;
      query the extracted plurality of text segments against a set of inverted indices, wherein the set of inverted indices comprises attributes of a set of predefined data structure entities and associated relationships based on weight values in an entity model structure;
      construct a set of entity graphs including a plurality of entity nodes connected by a weighted edge representing the matching attributes and associated relationships between the plurality of text segments and the attributes of the set of predefined data structure entities, between the attributes and the set of predefined data structure entities, and between entities in the set of predefined data structure entities;
      rank the constructed set of entity graphs based on a sum of the weight values associated with the matching attributes and associated relationships; and select higher scored one or more entity graphs of the set of entity graphs based on the ranking.

9. The computer system of claim 8 further comprising a parser to parse the document and to extract the text segment of the document.

10. The computer system of claim 8 further comprising a package of text recognition techniques to obtain the structure of the document.

11. The computer system of claim 8 further comprising:
the set of entity graphs built upon the matching attributes and associated relationships, the set of entity graphs including a plurality of possible interpretations of the plurality of text segments;
a set of unambiguous graph variants for each entity graph in the set of entity graphs; and
a set of groups, each group including a subset of the set of entity graphs and representing interpretations of the plurality of text segments.

12. The computer system of claim 8 further comprising an integrated data storage unit that includes a set of structures of integrated data from matching the set of predefined data structure entities with the plurality of text segments.

13. The computer system of claim 8, wherein the document comprises an invoice, the predefined data structure entities comprises attributes of a purchase order, and the set of entity graphs comprises the matching attributes and associated relationships between the invoice and the purchase order.

14. A computer implemented method comprising:
receiving a document containing text or unstructured data, wherein the document is a representation of a physical business object stored in a document storage unit;
identifying and extracting a plurality of text segments and structure of the document using a set of tagging and natural language processing techniques;
querying the extracted plurality of text segments against a set of inverted indices, wherein the set of inverted indices comprises attributes of a set of predefined data structure entities and associated relationships based on weight values in an entity model structure;
for a text segment from the extracted plurality of text segments, storing matching attributes of the set of predefined data structure entities and associated relationships;
constructing a set of entity graphs including a plurality of entity nodes connected by a weighted edge representing the matching attributes and associated relationships between the plurality of text segments and the attributes of the set of predefined data structure entities, between the attributes and the set of predefined data structure entities, and between data structure entities in the set of predefined entities;
ranking the set of entity graphs based on a sum of the weight values associated with the matching attributes and associated relationships; and
selecting higher scored one or more entity graphs of the set of entity graphs based on the ranking.

15. The method of claim 14 further comprising:
parsing the document via a parser; and
in response to parsing the document, extracting the text segment of the document.

16. The method of claim 14 further comprising:
applying text recognition techniques to the document; and
in response to applying the text recognition techniques, obtaining the structure of the document.

17. The method of claim 14, further comprising:
determining the matching attributes and associated relationships for at least one of the queried plurality of text segments; and
determining the weight values for the matching attributes and associated relationships between the at least one of the queried plurality of text segments and the set of predefined data structure entities to construct the set of entity graphs.

18. The method of claim 17, further comprising:
creating a set of unambiguous graph variants for each entity graph in the set of entity graphs; and
creating a set of groups, each group including a subset of the set of entity graphs and representing interpretations of the at least one of the queried plurality of text segments.

19. The method of claim 18, further comprising:
summing the weight values for the matching attributes and associated relationships in each entity graph of the set of groups; and
selecting entity graph from each group of the set of groups, the entity graph having a best weight value and representing a best interpretation of the at least one of the queried plurality of text segments.

20. The method of claim 14, wherein the document comprises an invoice, the predefined data structure entities comprises attributes of a purchase order, and the set of entity graphs comprises the matching attributes and associated relationships between the invoice and the purchase order.

* * * * *